US012546286B2

(12) United States Patent
Esbensen et al.

(10) Patent No.: US 12,546,286 B2
(45) Date of Patent: Feb. 10, 2026

(54) OPERATING A WIND TURBINE FOR WAKE CONTROL

(71) Applicant: Siemens Gamesa Renewable Energy A/S, Brande (DK)

(72) Inventors: Thomas Esbensen, Herning (DK); Pieter M. O. Gebraad, København (DK); Gustav Hoegh, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/558,515

(22) PCT Filed: May 3, 2022

(86) PCT No.: PCT/EP2022/061799
§ 371 (c)(1),
(2) Date: Nov. 1, 2023

(87) PCT Pub. No.: WO2022/233840
PCT Pub. Date: Nov. 10, 2022

(65) Prior Publication Data
US 2024/0240614 A1 Jul. 18, 2024

(30) Foreign Application Priority Data
May 7, 2021 (EP) .................................... 21172753

(51) Int. Cl.
*F03D 7/04* (2006.01)
*F03D 1/06* (2006.01)
(52) U.S. Cl.
CPC ......... *F03D 7/049* (2023.08); *F03D 1/06495* (2023.08); *F05B 2240/3052* (2020.08); *F05B 2240/3062* (2020.08); *F05B 2270/204* (2020.08)

(58) Field of Classification Search
CPC ...... F03D 1/06495; F03D 7/048; F03D 7/049; F05B 2240/3062
See application file for complete search history.

(56) References Cited

U.S. PATENT DOCUMENTS 9,760,069 B2 * 9/2017 Betran Palomas ..... F03D 7/048
10,683,845 B2 * 6/2020 Taylor ..................... F03D 7/042
(Continued)

FOREIGN PATENT DOCUMENTS

EP 2757255 A1 7/2014
EP 2715122 B1 7/2018
(Continued)

OTHER PUBLICATIONS

PCT International Search Report and Written Opinion of International Searching Authority mailed Aug. 19, 2022 corresponding to PCT International Application No. PCT/EP2022/061799 filed May 3, 2022.

*Primary Examiner* — Sang K Kim
(74) *Attorney, Agent, or Firm* — Schmeiser, Olsen & Watts LLP

(57) ABSTRACT

A method of operating a wind turbine for controlling wake wherein the wind turbine includes at least a rotor blade and a plurality of aerodynamic devices for influencing the airflow flowing on the rotor blade, the aerodynamic device being movable between at least a respective first configuration and a second respective configuration, the method including the step of moving the aerodynamic device between the first configuration and the second configuration for influencing a wake generated by the wind turbine.

9 Claims, 6 Drawing Sheets

(56) References Cited

U.S. PATENT DOCUMENTS

| | | | | |
|---|---|---|---|---|
| 2009/0285682 A1* | 11/2009 | Baker | .................... | F03D 7/022 |
| | | | | 416/1 |
| 2011/0142595 A1* | 6/2011 | Santiago | ............... | F03D 1/0675 |
| | | | | 416/235 |
| 2011/0223033 A1* | 9/2011 | Wang | .................... | F03D 1/0675 |
| | | | | 416/235 |
| 2013/0037657 A1* | 2/2013 | Breidenthal | .......... | F04D 29/563 |
| | | | | 296/180.1 |
| 2018/0100486 A1* | 4/2018 | Otake | ................... | F03D 7/0204 |
| 2022/0128029 A1* | 4/2022 | Kimilli | ................ | F03D 7/0256 |

FOREIGN PATENT DOCUMENTS

| | | | |
|---|---|---|---|
| EP | 3578808 | A1 | 12/2019 |
| EP | 2007981 | B1 | 1/2021 |

\* cited by examiner

OPERATING A WIND TURBINE FOR WAKE CONTROL

CROSS-REFERENCE TO RELATED APPLICATIONS

This application claims priority to PCT Application No. PCT/EP2022/061799, having a filing date of May 3, 2022, which claims priority to EP Application Serial No. 21172753.2, having a filing date of May 7, 2021, the entire contents both of which are hereby incorporated by reference.

FIELD OF TECHNOLOGY

The following relates to operating a wind turbine, wherein in particular wake interactions with other wind turbines are considered. Embodiments of the present invention may be applied to a wind park comprising a plurality of wind turbines.

BACKGROUND

A wind park comprises a plurality of wind turbines for extracting energy from the wind and converting such mechanical energy into electric energy. Due to the extraction of the energy by the rotating rotor blades, the wind stream is affected and modified downstream a considered wind turbine. In particular, downstream of an operating wind turbine there is a wake region generated due to the interaction with the rotor blades of the upstream wind turbine in which the wind speed is reduced and in which in general the wind condition is altered compared to a wind condition upstream the considered wind turbine. In general, downstream wind turbines may be subjected to lower wind speed than the upstream wind turbines. The velocity deficit in the wakes of upstream turbines will reduce the production of the downstream turbines, and the increased turbulence may increase loads on downstream turbines. The effects are generally larger if the downstream turbine is standing close-by the upstream turbine, because the wake of the upstream turbine will gradually recover to the free-stream (i.e. not wake-affected) conditions as the it flows downstream, through turbulent mixing with the ambient flow.

A conventional way to optimize flow in a wind park is to adjust the blade pitch or rotor speed control settings of the upstream wind turbines to increase the flow speed in the wake of the turbine. An approach of this type is for example describe in EP 2 757 255 A1.

It has however been observed that the conventional methods for determining control settings of wind turbines in a wind park do not in all conditions lead to optimized or desired performance of the wind park, in particular regarding power output and/or load, in particular fatigue load. Limited capacity of pitch actuation may be limiting the potential to use pitch for wake control.

It may be therefore desirable to operate a wind turbine, in particular in a wind turbine park, in order to optimize the power output and/or to keep loads within acceptable limits, by appropriately controlling the wake generated by the wind turbine.

SUMMARY

According to a first aspect of embodiments of the present invention, it is provided a method of operating a wind turbine for controlling wake, the wind turbine including at least a rotor blade and a plurality of aerodynamic devices for influencing the airflow flowing on the rotor blade, each aerodynamic device being movable between at least a respective first configuration and a second respective configuration, the method comprising the step of moving the aerodynamic device between the first configuration and the second configuration for influencing a wake generated by the wind turbine. Each rotor blade comprises more than one aerodynamic device, each aerodynamic device being moved between the first configuration and the second configuration depending on a radial position of the aerodynamic device along the rotor blade.

The term "radial" is to be referred to in reference to a rotor axis of a wind rotor of the wind turbine, the wind rotor including at least a rotor blade. With "radial" it is therefore meant a direction between the root of the blade and the tip of the blade. This direction is frequently also called "span" of the rotor blade.

The verb "to move", when referred to the aerodynamic device, may mean to tilt, to turn, to pivot, to fold, to flap, or to swing out or in. Nevertheless, the radial position of each aerodynamic device on the blade surface remains particularly static.

According to a second aspect of embodiments of the present invention, it is provided a wind turbine a comprising:
- at least one the rotor blade,
- a plurality of aerodynamic devices on the rotor blade being movable between at least a respective first configuration and a respective second configuration for influencing the airflow flowing on the rotor blade,
- a controller configured for executing the steps of the method above described.

Embodiments of this invention may be applied to both onshore and offshore wind parks comprising a plurality of wind turbines.

As "aerodynamic device" it is meant any flap or spoiler or micro tab or an active suction or blowing jet or an actively changing vortex generator or a slat or similar aerodynamic add-on devices, which are provided on the surface of a wind turbine blade and are actively movable between at least two configurations. In at least one of such configurations the aerodynamic device influences the airflow flowing on the surface of the rotor blade, from the leading edge to the trailing edge. According to embodiments of the present invention, the aerodynamic device may be movable between a first inactive configuration, in which the aerodynamic device does not influence the airflow, and a second active configuration, in which the aerodynamic device is deployed and influences the airflow on the blade. Each aerodynamic device may be movable between the first inactive configuration and the second active configuration depending on a radial position of the aerodynamic device along the rotor blade.

Embodiments of the present invention permit to use the aerodynamic device of the wind blade to control, for example to steer wake, so that other type of wake controls, for example based on adjusting the blade pitch or the rotor speed or the yaw angle, may be avoided, or supplemented. The inconveniences of the prior art, for example a limited capacity of pitch actuation, may be advantageously avoided. Embodiments of the present invention may determine an improvement of the Annual Energy Production (AEP) of a wind park.

The wind turbine comprises a plurality of aerodynamic devices and the method comprises the step of moving the plurality of aerodynamic devices between the first configuration and the second configuration. Of such a plurality of aerodynamic devices, each blade may comprise at least one aerodynamic device. In a first step of the method, the aerodynamic devices may be moved from an initial inactive configuration to a final active configuration, or vice versa from an initial active configuration to a final inactive configuration. In a second step of the method, the aerodynamic devices may be moved from the final configuration back to the initial configuration. The moving of the aerodynamic devices may be performed on a blade independently from the aerodynamic devices on the other blades. The individual activation of the aerodynamic devices on one blade may be moved depending on the position of the blade on the rotor plane of the wind turbine, i.e. on the azimuth angle of the blade, which is the angle between the blade and a vertical direction. Activating the blades individually generates yaw and tilt moments can be introduced on the rotor. This creates asymmetric forces on the flow which will deflect the wake affected area in the crosswind direction away from a downstream turbine. Temporary variations of the rotor yaw and tilt moments leads to an increased large-scale wake turbulence, and subsequently faster wake recovery due to increased mixing with ambient wind flow, and thus faster recovery to the free-stream conditions. The first and the second step of the method above described, i.e. activation and deactivation or deactivation and activation of the aerodynamic devices on one blade, may performed periodically, the frequency of excitation being adjustable, so as to reduce power and/or load impact on the wind turbine and at the same time maximize effect of the excitation on the wake in terms of deflection and/or large scale turbulence. Strain sensors may be provided on the blade or on the turbine shaft for measuring loads and derive rotor yaw and tilt moments. Feedback of rotor yaw and tilt moment measurements permits to control the rotor yaw and tilt moment when controlling the aerodynamic devices.

According to embodiments of the invention, the aerodynamic devices may be moved, thus creating spatial variation of the velocity deficit in the wake, but without applying a moment aiming to deflect the wake. For example, all the aerodynamic devices in a wind turbine may be activated simultaneously for a limited time interval. The increase of velocity gradients in the wake (i.e. increase of induced turbulence) may result in increased mixing in the wake, which helps mixing with ambient wind flow, and thus faster recovery to the free-stream conditions, which may improve power production on a downstream turbine. In a first step of the method, the aerodynamic devices are moved from an initial inactive configuration to a final active configuration, or vice versa from an initial active configuration to a final inactive configuration. In a second step of the method, the aerodynamic devices are moved from the final configuration back to the initial configuration. The first and the second step of the method above described may performed periodically, according to an optimal excitation frequency f, which is to be determined experimentally, but may be characterized in terms of the dimensionless Strouhal number $St=f*D/U$, in order to adjust the frequency to wind speed U and rotor diameter D.

The plurality of aerodynamic devices positioned along the blade at respective radial positions may alternate their configuration along the blade. For example, if four flaps are present at four respective radial positions, a first flap close to the rotational axis may be configured with a first fine angle increasing local lift, a second flap at a second radial position may be configured with a second higher angle reducing local lift, a third flap at a third radial position may be configured with the first angle and a fourth flap at a most external radial position may be configured with the second angle. This permits to minimize or reduce the overall rotor torque on the blade when applying the wake control.

According to embodiments of the invention, the aerodynamic devices may be moved depending on an azimuth angle of the respective rotor blades on a rotor plane. Considering the rotor disc swept by each blade for every rotation, the two half rotor discs in which the rotor disc is divided by a vertical plane may be called the right side and the left side of the rotor disc. According to such embodiments of the invention, the aerodynamic devices may be moved only when they are on the right side or on the left side of the rotor disc. In this way, the wake recovery in part of the wake may be stimulated which may be beneficial in situations where the wake only partially overlaps with a downstream turbine.

According to embodiments of the invention, the aerodynamic devices are moved depending on a radial position, with respect to the rotation axis of the wind turbine, of the aerodynamic device along the blade. For example, only activating the aerodynamic devices in the outer part of the rotor where it would affect the wake mixing in the outer part of the wake. Alternatively, only activating the aerodynamic devices in the inner part of the rotor where it would affect the wake mixing in the inner part of the wake. Activation of the aerodynamic devices may also follow each other subsequently in different parts along the blades, in order to excite different dynamically changing large turbulent structures in the wake.

By using only part of the rotor for the wake control, the power production impact on the upstream turbine may be smaller (i.e. less lost power production on the front turbine as a result of the excitation).

BRIEF DESCRIPTION

Some of the embodiments will be described in detail, with reference to the following figures, wherein like designations denote like members, wherein.

Figure 1:
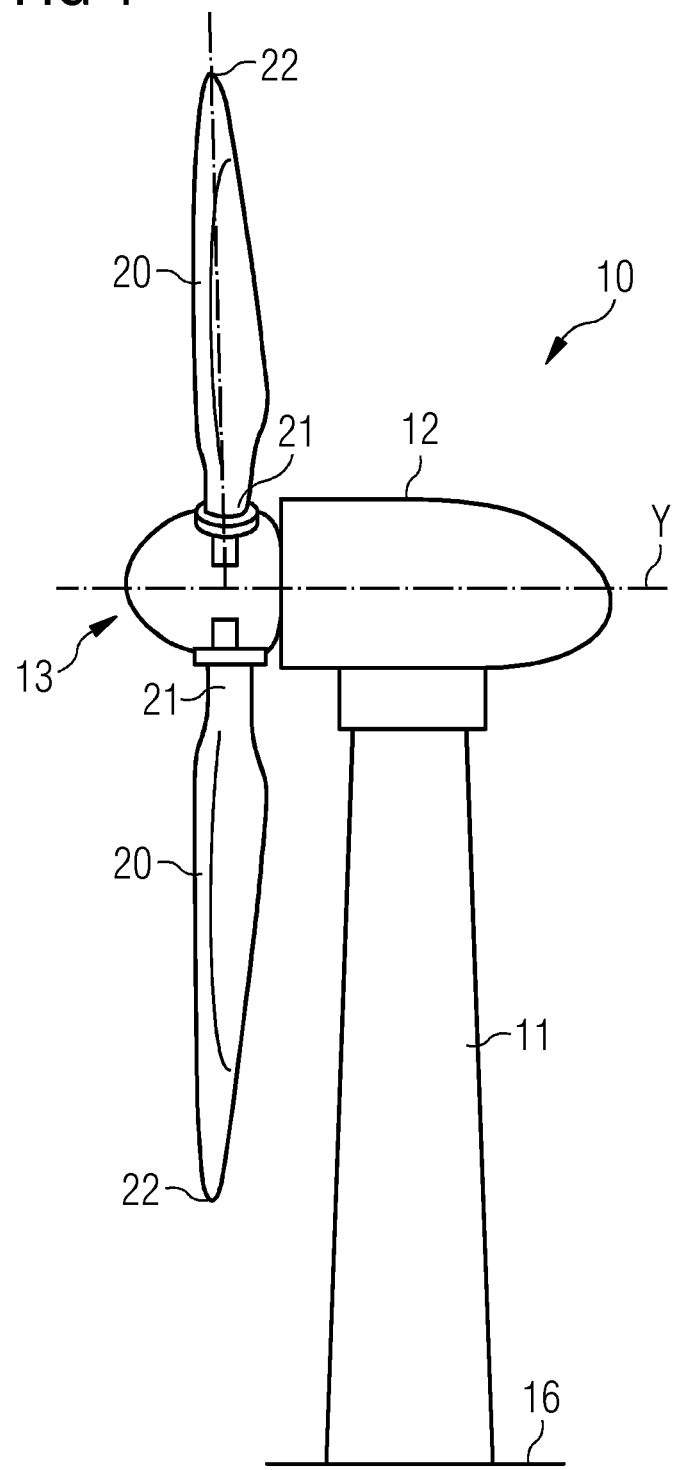
FIG. 1 shows a wind turbine.
Figure 5:
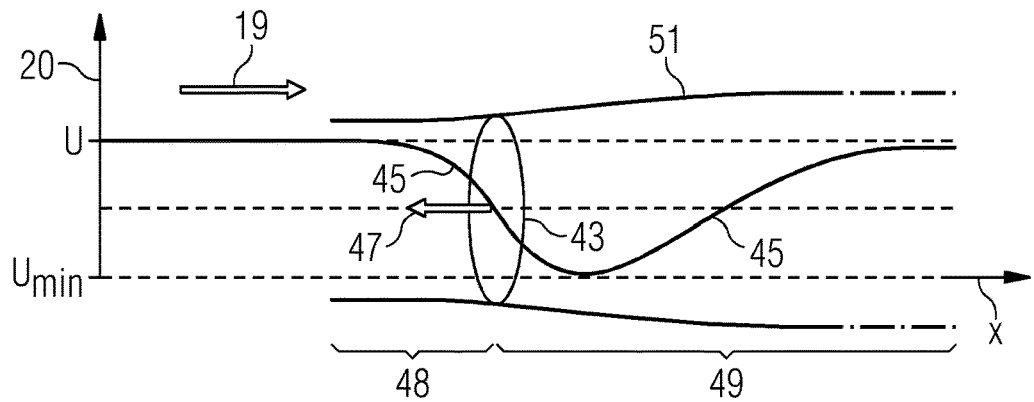
Figure 6:
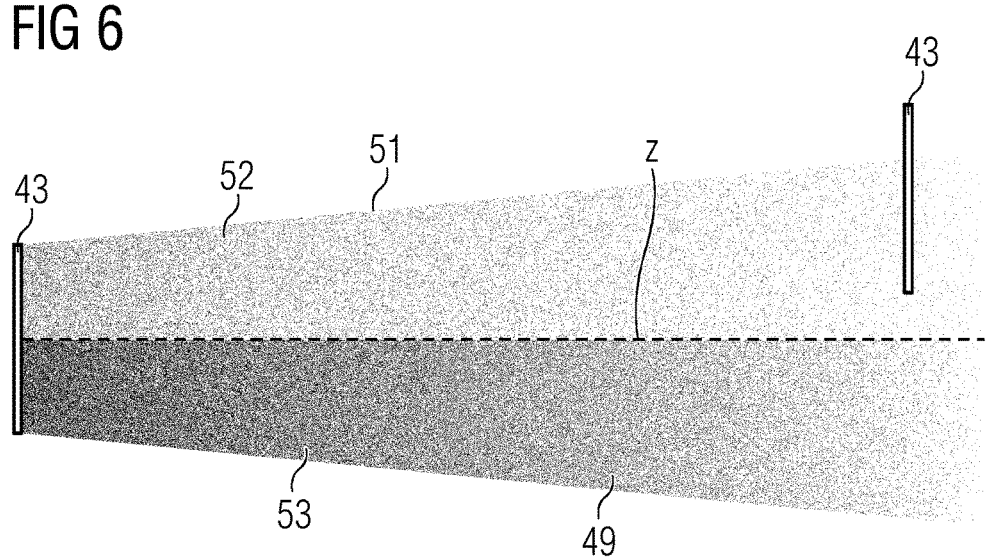
Figure 7:
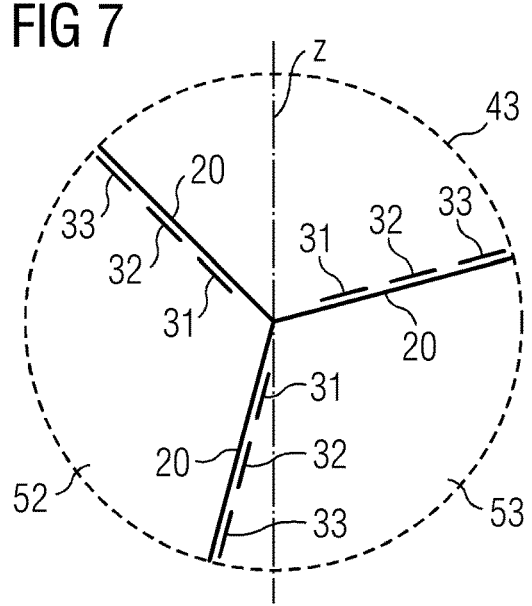
Figure 8:
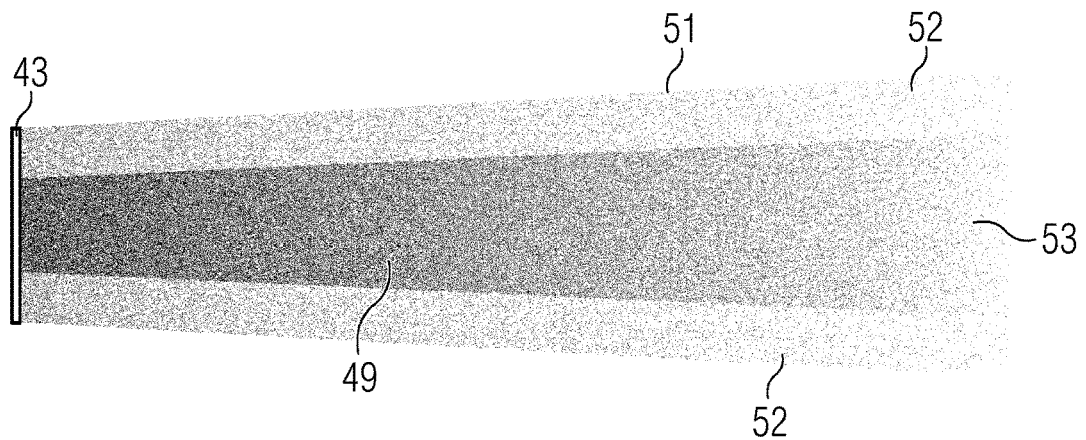
Figure 9:
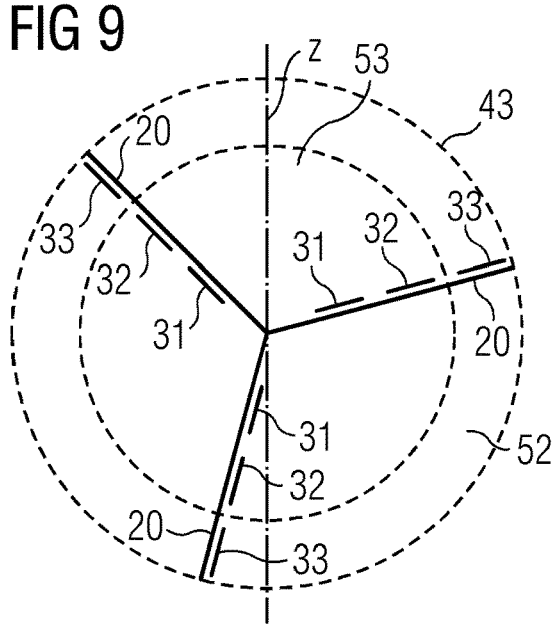
Figure 10:
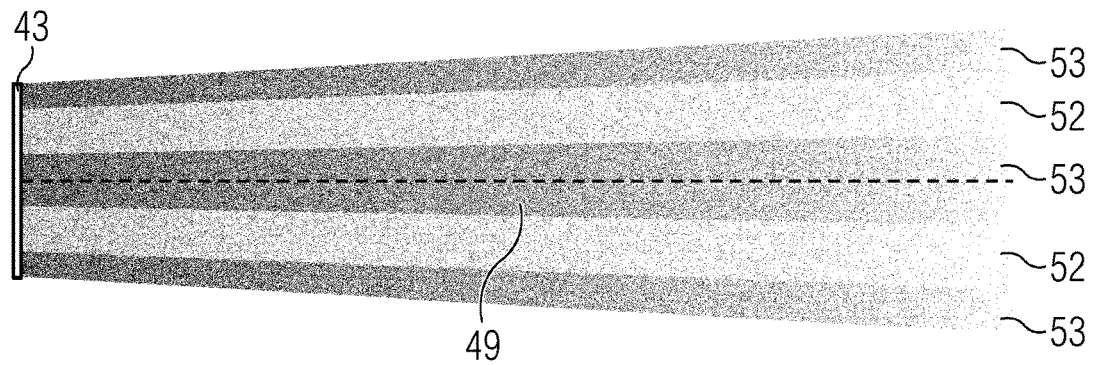
Figure 11:
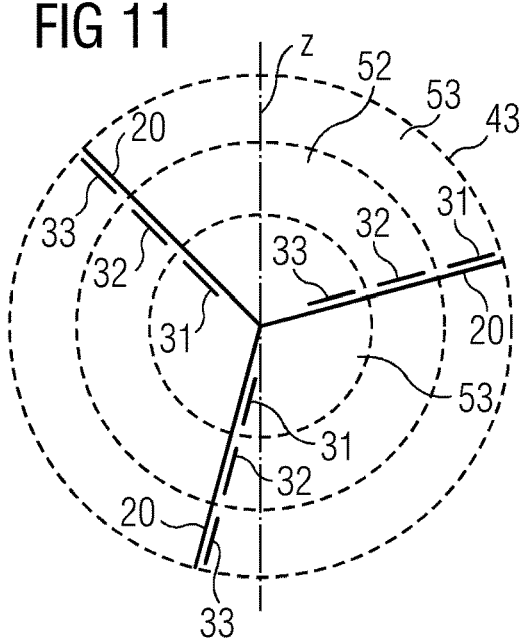
Figure 12:
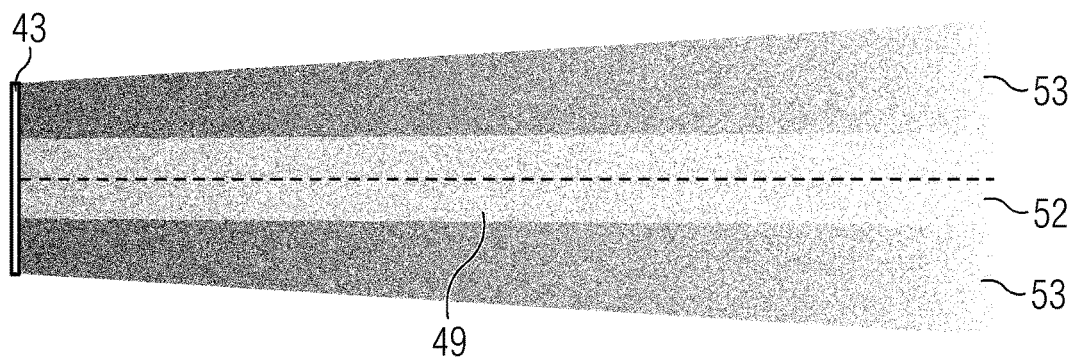
Figure 13:
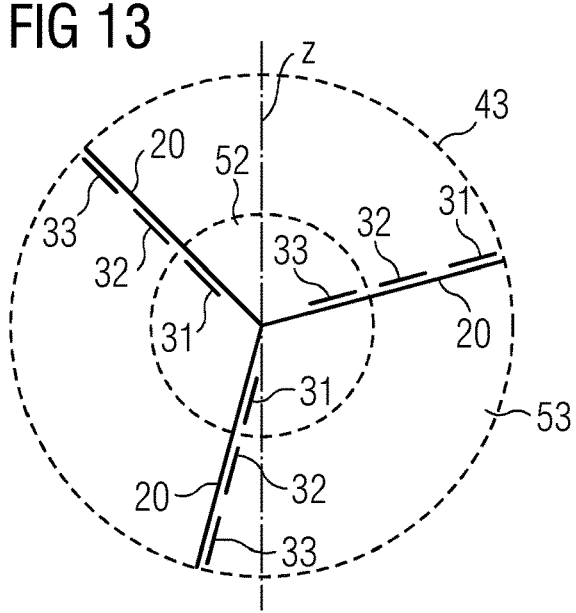

FIG. 5 schematically shows wind flow characteristics upstream and downstream a wind turbine creating a wake region;

FIG. 6 shows a lateral view of the rotor disc of the wind turbine of FIG. 1 and of the wake region generated thereby, according to an embodiment of the method of the present invention;

FIG. 7 shows a frontal view of the rotor disc of the wind turbine of FIG. 1 including a plurality of aerodynamic devices along each blade and operated according to the embodiment of the method of the present invention as shown in FIG. 6;

FIG. 8 shows a lateral view of the rotor disc of the wind turbine of FIG. 1 and of the wake region generated thereby, according to another embodiment of the method of the present invention;

FIG. 9 shows a frontal view of the rotor disc of the wind turbine of FIG. 1 including a plurality of aerodynamic devices along each blade and operated according to the embodiment of the method of the present invention as shown in FIG. 8;

FIG. 10 shows a lateral view of the rotor disc of the wind turbine of FIG. 1 and of the wake region generated thereby, according to a further embodiment of the method of the present invention;

FIG. 11 shows a frontal view of the rotor disc of the wind turbine of FIG. 1 including a plurality of aerodynamic devices along each blade and operated according to the embodiment of the method of the present invention as shown in FIG. 10;

FIG. 12 shows a lateral view of the rotor disc of the wind turbine of FIG. 1 and of the wake region generated thereby, according to yet another embodiment of the method of the present invention and FIG. 13 shows a frontal view of the rotor disc of the wind turbine of FIG. 1 including a plurality of aerodynamic devices along each blade and operated according to the embodiment of the method of the present invention as shown in FIG. 12.

DETAILED DESCRIPTION

The drawings are in schematic form. Similar or identical elements are referenced by the same or different reference signs.

FIG. 1 shows a conventional wind turbine 10 for generating electricity. The wind turbine 10 comprises a tower 11 which is mounted on the ground 16 at one end. Alternatively, the wind turbine 10 may be an offshore wind turbine. At the opposite end of the tower 11 there is mounted a nacelle 12. The nacelle 12 is usually mounted rotatable about the tower 11, which is referred to as comprising a yaw axis substantially perpendicular to the ground 16. The nacelle 12 typically accommodates the generator of the wind turbine and the gear box (if the wind turbine is a geared wind turbine). Furthermore, the wind turbine 10 comprises a wind rotor 13 which is rotatable about a rotor axis Y. When not differently specified, the terms axial, radial and circumferential in the following are made with reference to the rotor axis Y. The wind rotor 13 is capable to rotate about the rotor axis Y and to transfer the rotational energy to an electrical generator (not shown) and comprises at least one blade 20 (in the embodiment of FIG. 1, the wind rotor comprises three blades 20, of which only two blades 20 are visible). The blades 20 extend substantially radially with respect to the rotational axis Y. Each rotor blade 20 is usually mounted pivotable to the rotor 13, in order to be pitched about respective pitch axes X. Each rotor blade 20 is mounted to the wind rotor 13 at its root section 21. The root section 21 is opposed to the tip section 22 of the rotor blade. The wind turbine 10 may be comprised in an onshore or offshore wind park comprising a plurality of wind turbines.

Figure 2:
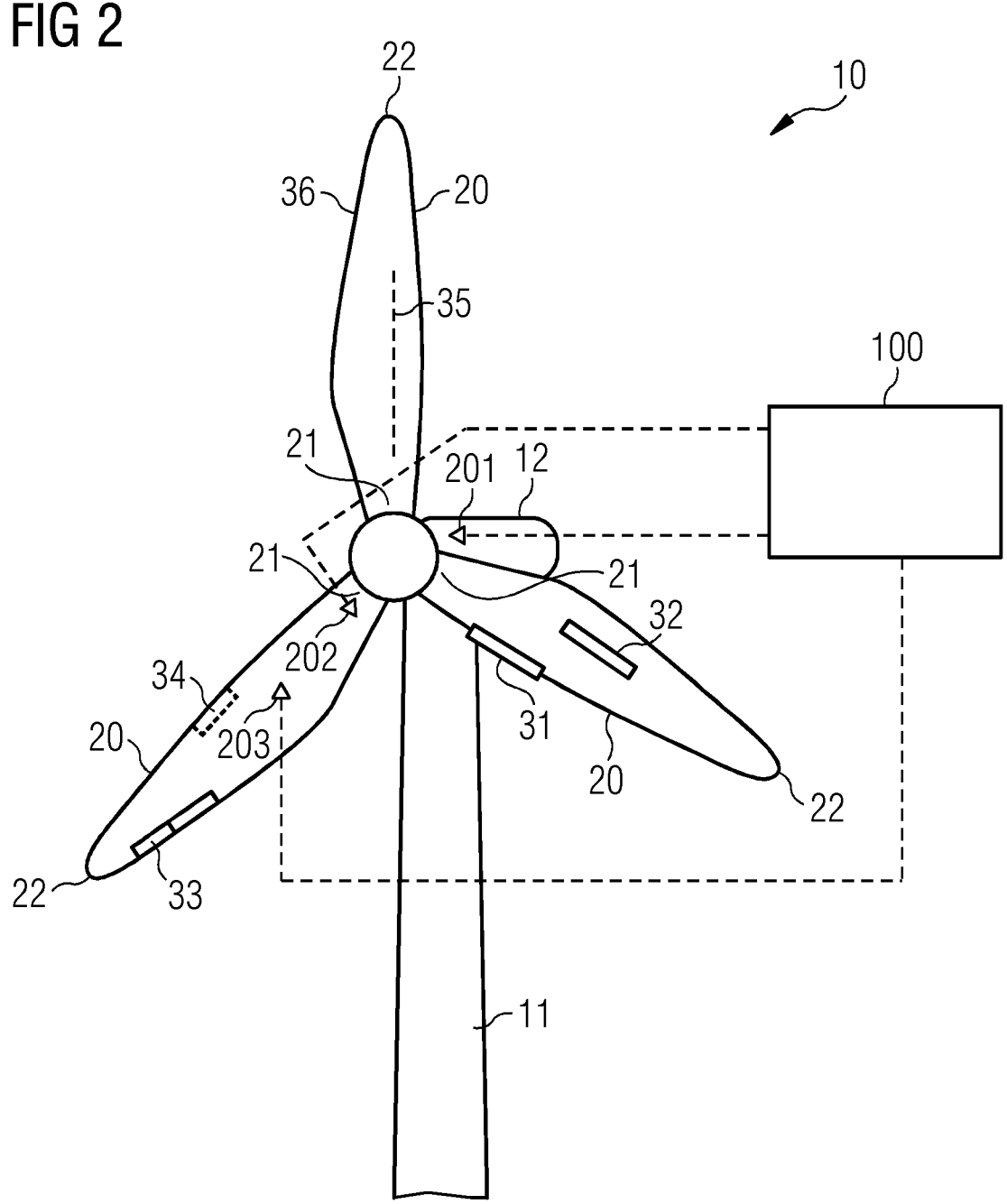
FIG. 2 shows a wind turbine with a plurality of active aerodynamic device on the rotor blades.
Figure 3:
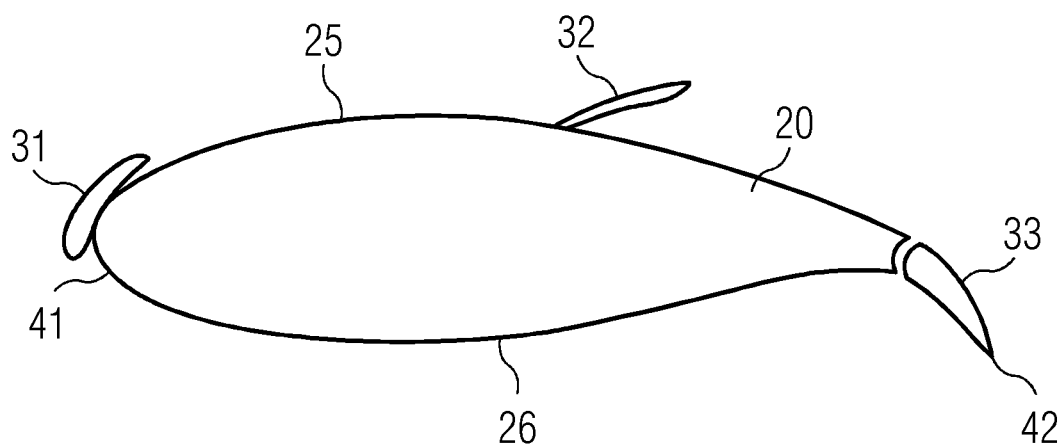
FIG. 3 shows a radial section of one rotor blade of FIG. 2.
Figure 4:
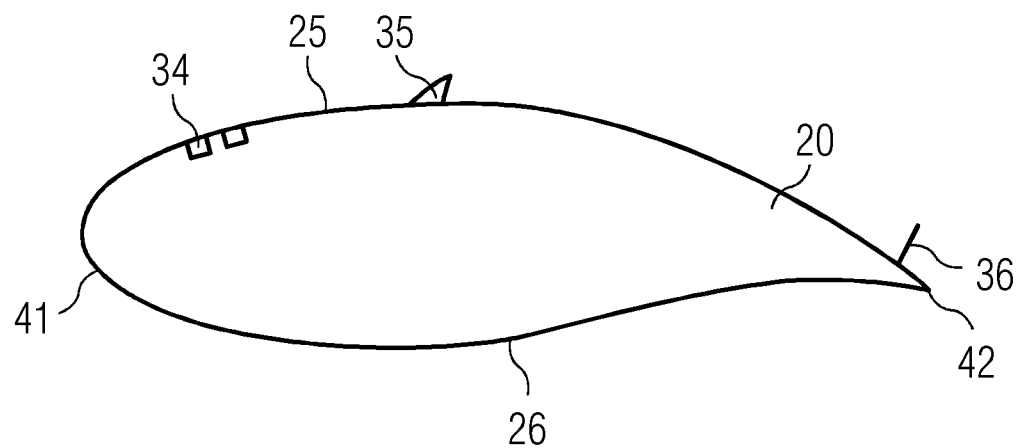
FIG. 4 shows another radial section of one rotor blade of FIG. 2.

FIGS. 2 to 4 illustrate a plurality of active aerodynamic devices 31, 32, 33, 34, 35, 36 provided on the rotor blades 20. Between the root section 21 and the tip section 22 the rotor blade 20 furthermore comprises a plurality of aerofoil sections for generating lift. Each aerofoil section comprises a suction side 25 and a pressure side 26. The aerofoil shape of the aerofoil portion is symbolized by two aerofoil profiles which are respectively shown in FIGS. 3 and 4 and which illustrates the cross-sectional shape of the rotor blade at this spanwise position. The suction side 25 is divided or separated from the pressure side 26 by a leading edge 41, where the incoming airflow meets the blade 20 and a trailing edge 42, where the airflow leaves the blade. As shown in the exemplary embodiment of FIG. 3, a first active aerodynamic device 31 is a slat provided at the leading edge 41, a second active aerodynamic device 32 is a spoiler provided between the leading edge 41 and the trailing edge 42 and a third active aerodynamic device 33 is a flap provided at the trailing edge 42. As shown in the exemplary embodiment of FIG. 4, a fourth active aerodynamic device 34 is a plurality of microjets for suction or blowing of air provided between the leading edge 41 and the trailing edge 42, a fifth active aerodynamic device 35 is a plurality of vortex generators provided between the leading edge 41 and the trailing edge 42 and a sixth active aerodynamic device 36 is a plurality of micro tabs provided at the trailing edge 42. The active aerodynamic devices 31, 32, 33, 34, 35, 36 are also shown on FIG. 2: a flap 33 and a plurality of microjets 34 for suction or blowing of air being shown on a first rotor blade 20, a slat 31 and a flap 32 being shown on a second rotor blade 20, a plurality of vortex generators 35 and a plurality of micro tabs 36 being shown on a third rotor blade 20. According to embodiments of the invention, the active aerodynamic devices 31, 32, 33, 34, 35, 36 provided on one rotor blade 20 may be different from the active aerodynamic devices 31, 32, 33, 34, 35, 36 provided on the other rotor blades 20. According to other embodiments of the invention, the blades 20 of the same wind turbine 10 may include the same active aerodynamic devices 31, 32, 33, 34, 35, 36. According to other embodiments of the invention, the blades 20 may include other type of active aerodynamic devices 31, 32, 33, 34, 35, 36, different from the ones above described. The aerodynamic device 31, 32, 33, 34, 35, 36 according to embodiments of the present invention is movable between an inactive configuration, in which the influence of the aerodynamic device 31, 32, 33, 34, 35, 36 on the airflow is minimal or negligible and an active configuration in which the aerodynamic device 31, 32, 33, 34, 35, 36 influences the airflow. For example, the spoiler 32 and the vortex generators 35 are aligned to the suction side 25 in the inactive configuration (not shown) and protruding from the suction side 25 in the active configuration (as shown in FIGS. 3 and 4, respectively). The flaps 33 and micro tabs 36 are aligned to the suction side 25 at the trailing edge 42 in the inactive configuration (not shown) and deviating from the suction side 25 in the active configuration (as shown in FIGS. 3 and 4, respectively). The plurality of microjets 34 are open for suction or blowing of air in the active configuration and closed in the inactive configuration.

FIG. 2 further illustrates a plurality of sensors 201, 202, 203 installed on the wind turbine 10. A first sensor 201 may be on the nacelle 12, for example on the shaft connected to the wind rotor for measuring a bending motor on the shaft. A second sensor 202 may be provided on a rotor blade 20 at the root section 21. A third sensor 203 may be provided on a rotor blade 20 between the root section 21 and the tip section 22. The second sensor 202 and/or the third sensor 203 may be provide on any of the blades 20. According to other embodiments of the present invention (not shown), the sensor(s) may be provided in different number and positions. The wind turbine 10 further includes a controller 100 connected to the plurality of sensors 201, 202, 203 or receiving a respective sensor output signal. The sensor(s) 201, 202, 203 may be any sensor for generating as output signal a strain signal or displacement signal or rotation signal or natural frequency signal or rotational speed or acceleration signal. The controller 100 is further connected to a plurality of activators (not shown in FIG. 2) for respectively moving the aerodynamic device 31, 32, 33, 34, 35, 36 between their respective active and inactive configurations.

FIG. 5 schematically illustrates wind flow upstream and downstream a wind turbine having rotor blades rotating in a rotor disk 43, i.e. the disc swept by each complete rotation of each blade 20 about the rotor axis Y. Upstream the rotor disk 43, the wind 19 has a free-stream wind velocity U which then varies in dependence of a lateral position x according to a first curve 45 for a first turbulence and according to a second curve 46 for a second turbulence in a coordinate system having as ordinate 20 wind speed and having as abscissa lateral extent x. Immediately upstream the rotor disk 43 an axial induction zone 48 is defined. The axial induction zone 48 be described as the region where the inflow wind speed decelerates due to the extraction of kinetic energy from the free-stream wind flow. The rotor disk 43 including the rotating rotor blades exerts a force 47 on the wind 19 resulting in a decrease of the wind velocity 45 downstream the rotor disk 43. The wind velocity 45 reaches downstream the rotor disk 43 a minimum $U_{min}$ and increases then within a wake region 49 substantially towards the upstream wind velocity U. The region 51 defines a shape of the wake 49.

The operating method according to embodiments of the present invention comprises the steps of moving the aerodynamic device 31, 32, 33, 34, 35, 36 between a first configuration and a second configuration for influencing a wake generated by the wind turbine. The initial configuration of each aerodynamic device 31, 32, 33, 34, 35, 36 may be coincident with the respective inactive or active configuration. Correspondingly, the final configuration of each aerodynamic device 31, 32, 33, 34, 35, 36 may be coincident with the respective active or inactive configuration.

FIGS. 6 and 7 schematically illustrates a first embodiment of the operating method. Each blade 20 includes three aerodynamic devices 31, 32, 33, respectively radially internal (adjacent to the blade root 21), intermediate and radially external (adjacent to the blade tip 22). Considering a vertical plane Z including the rotor axis Y, the rotor disc 43 is divided in two half rotor discs, the aerodynamic devices 31, 32, 33 being moved to the respective active configuration only when they are in one of the two half rotor discs and in the respective inactive configuration only when they are in the other of the two half rotor discs. The wake region 49 is correspondingly divided in a first sub-region 52 and in a second sub-region 53, the first sub-region 52 being more subject to the turbulences induced by the aerodynamic devices 31, 32, 33 and therefore characterized by a faster recovery to ambient conditions.

FIGS. 8 and 9 schematically illustrates a second embodiment of the operating method. The second embodiment differentiates itself from the first embodiment in that only the external aerodynamic devices 33 are moved to the respective active configurations for at least a complete rotation of the wind rotor 13. The configuration of the aerodynamic devices 33 is therefore independent from the azimuth angle of the respective blade 20. The first sub-region 52 is therefore annularly shaped around the second sub-region 53 of the wake region 49.

FIGS. 10 and 11 schematically illustrates a third embodiment of the operating method. The third embodiment differentiates itself from the second embodiment in that only the intermediate aerodynamic devices 32 are moved to the respective active configurations for at least a complete rotation of the wind rotor 13. The first sub-region 52 is therefore annularly shaped and interposed between an external portion of the second sub-region 53 and an internal portion of the second sub-region 53 of the wake region 49.

FIGS. 12 and 13 schematically illustrates a fourth embodiment of the operating method. The fourth embodiment differentiates itself from the second embodiment in that only the internal aerodynamic devices 31 are moved to the respective active configurations for at least a complete rotation of the wind rotor 13. The first sub-region 52 is therefore conically shaped and surrounded by a second sub-region 53 of the wake region 49.

According to other embodiments (not shown), each blade 20 comprises more than one aerodynamic device 31, 32, 33. For example, each blade 20 may comprise two aerodynamic devices 31, 33, i.e. one internal aerodynamic device 31 and one external aerodynamic device 33. Alternatively, each blade 20 may comprise more than three aerodynamic devices 31, 32, 33, i.e. one internal aerodynamic device 31, one external aerodynamic device 33 and a plurality of intermediate aerodynamic device 32. Each aerodynamic device 31, 32, 33 is moved depending on the radial position along the rotor blade 20. According to the embodiments of the invention, any of the aerodynamic devices 31, 32, 33 may be moved to the respective active configurations for at least a complete rotation of the wind rotor 13.

The above-described embodiments produce beneficial effects for a second downstream wind turbine 20 (as exemplary shown in FIG. 6) have a respective rotor disc 43 at least partially subject to the first sub-region 52 of the wake region 49 and not subject to the second sub-region 53 of the wake region 49.

According to other embodiments (not shown), all the aerodynamic devices 31, 32, 33 of one blade 20 are moved to the respective active configurations, independently from the azimuth angle of such blade 20.

Activating the aerodynamic devices of the blades 20 individually generates yaw and tilt moments which may be measured and calculated in the controller 100 through the sensor(s) 201, 202, 203.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of operating a wind turbine for controlling wake effects on a downstream wind turbine, the wind turbine including at least a rotor blade and a plurality of aerodynamic devices for influencing an airflow flowing on the rotor blade, each aerodynamic device being movable between at least a respective first configuration and a second respective configuration, the method comprising:

moving each aerodynamic device between the first configuration and the second configuration controlled to induce turbulence and increase mixing with ambient wind flow for influencing a wake generated by the wind turbine and for wake recovery due to increased mixing with the ambient wind flow, and, as a function of influencing the wake, a recovery to the free-stream conditions that improve power production on the downstream wind turbine;

wherein each rotor blade comprises more than one aerodynamic device, each aerodynamic device being moved between the first configuration and the second configuration depending on a radial position of the aerodynamic device along the rotor blade.

2. The method according to claim 1, wherein in each rotor blade, any of the aerodynamic devices is moved to an active configuration for at least a complete rotation of the rotor blade.

3. The method according to claim 1, further comprising a first step of moving the plurality of aerodynamic devices from a first initial configuration to a second final configuration, and a second step of moving the plurality of aerodynamic devices back to the first initial configuration.

4. The method according to claim 3, wherein the first step and the second step of the method are performed periodically.

5. The method according to claim 1, wherein each aerodynamic device is moved depending on an azimuth angle of the respective rotor blades on a rotor plane.

6. The method according to claim 1, wherein the wind turbine is located in a wind park having at least two wind turbines, wherein the aerodynamic device is moved in such a way that a wake region generated by the wind turbine is divided in a first sub-region and in a second sub-region, the first sub-region being more subject to turbulences induced by the aerodynamic device than the second sub-region so that first sub-region recovers to ambient conditions faster than the second sub-region, a rotor disk of a second downstream wind turbines at least partially overlapping with the first sub-region of the wake region.

7. The method according to claim 1, wherein the first configuration and the second configurations are active and inactive configurations of the aerodynamic device.

8. A wind turbine comprising:
at least one rotor blade;
a plurality of aerodynamic devices on the rotor blade being movable between at least a respective first configuration and a respective second configuration for influencing an airflow flowing on the rotor blade; and
a controller executing the method according claim 1.

9. A wind park including the plurality of wind turbines according to claim 8.

* * * * *